United States Patent [19]

Tsumura

[11] Patent Number: 4,989,232
[45] Date of Patent: Jan. 29, 1991

[54] DEVICE FOR PROCESSING DIGITAL SIGNAL IN AUDIO-FREQUENCY BANDWIDTH

[75] Inventor: Naoki Tsumura, Yokohama, Japan

[73] Assignee: Ricoh Company, Ltd., Tokyo, Japan

[21] Appl. No.: 273,074

[22] Filed: Nov. 18, 1988

[30] Foreign Application Priority Data

Nov. 18, 1987 [JP] Japan .................. 62-289552

[51] Int. Cl.[5] ............ H04M 1/64; H04M 11/00
[52] U.S. Cl. ................. 379/88; 379/98; 379/100
[58] Field of Search ............ 379/88, 89, 67, 100, 379/98

[56] References Cited

FOREIGN PATENT DOCUMENTS

0152072 9/1982 Japan .................. 379/100
2166323 4/1986 United Kingdom .......... 379/88

Primary Examiner—Thomas W. Brown
Attorney, Agent, or Firm—Oblon, Spivak, McClelland, Maier & Neustadt

[57] ABSTRACT

A digital signal processing device for processing signals in the audio-frequency band with using a digital input-output interface circuit, analog input-output interfaces as well as digital signal processing circuit for converting digital signals to analog signals and vice versa. A memory is used for storing various programs for processing MODEM functions, voice-coding/synthesizing and the like in the digital signal processor selectively employs either one of the MODEM function processing programs and the voice coding/synthesizing function program, both of which are stored in the memory in accordance with an external command.

14 Claims, 4 Drawing Sheets

DEVICE FOR PROCESSING DIGITAL SIGNAL IN AUDIO-FREQUENCY BANDWIDTH

BACKGROUND OF THE INVENTION

1. Field of the Invention

The present invention relates to a digital signal processing device for processing signals in audio-frequency bandwidth for use in facsimile device constructed with digital and analog input-output interface, a digital signal processing, and a memory for storing various programs for processing MODEM function, voice-coding/synthesizing function, etc., in which the digital signal processing device selectively employs either one of a MODEM function processing program and a voice-coding/synthesizing function program, both of which are stored in the memory, in accordance with an external command.

2. Description of the Prior Art

In the recent years, various data communication devices such as facsimile device employing telephone circuit as the transmission path have been popularized.

Needless to mention, such data communication devices can be mutually connected only with the data communication device provided with the communicating function similar to that of the same type of terminal portion of the communication device.

Consequently, for instance, in case that a person employing the telephone calls dialing the data communication device with a wrong telephone number, the data communication device responds to a specialized tone signal. At this time, even though a constant period of time passes away, predetermined signal cannot be received. At this point of time, the telephone circuit is cut off forcibly.

Therefore, when the person making a telephone call to someone hears a meaninless tone signal, he (or she) cuts off the telephone circuit at this point of time. Otherwise, the telephone is placed in a soundless (silent) state during the time period from the starting of response to the tone signal to a cut off of the telephone circuit by the action of the data communication device of a telephone partner (listener). Under such the condition, the partner performs a response action such as the cut off of the telephone circuit at the point of time when the soundless state has elapsed to some extent.

In such a way, in the case of receiving a wrong telephone call, when the data communication device employs the telephone circuit, it is necessary that the person making a wrong telephone call to a wrong number can surely notice to the partner that he (or she) connected the telephone call with the data communication device. For this reason, conventionally, a facsimile device capable of outputting the response voice message onto the telephone circuit when the arrival of telephone call is detected has been practically used, by way of example.

The type of facsimile device, as described heretofore, is constructed with several units. A control section is used as the portion for performing the control processing for the overall facsimile device and for control procedure processing, for the actual facsimile transmission. The control program is stored in a program memory. A scanner is used as a unit for reading out an original manuscript to be transmitted with a predetermined image resolution. A plotter is used as a unit for outputting (printing out) the received image with a predetermined image resolution.

A manipulation/display section is used as a unit for manipulating the facsimile device. A coding/restoring (decoding) section is used as a unit for compressing the code of the image signal to be transmitted and, in addition, for restoring the received image information to the original image signal.

A MODEM section has a function of modulating and demodulating the digital data such that an analog circuit network such as a public telephone circuit network, etc. can be employed as a transmission circuit. A network controlling device is employed for connecting the facsimile device with the public telephone circuit network. A handset is employed for speaking over the telephone by use of the telephone circuit and recording the voice in response. Moreover, the network controlling device is provided with an automatic transmitting and receiving function.

A voice-coding/synthesizing device has a function of converting the voice message to a coded signal in order to create the voice data corresponding thereto and the same further has a function of synthesizing the original voice data. The voice data memory stores the voice data created by the voice-coding/synthesizing device. And further, as a coding system of the voice-coding/synthesizing device, it will be possible to employ, for instance, an Application Difference Part PCM (ADPCMf) System, etc. recommended by CCITT.

A change-over unit (switch) connects the facsimile device side connection terminal of the network controlling device with the MODEM or the voice-coding/synthesizing device by the action of change-over.

In a system such as is mentioned heretofore, when an operator manipulates the manipulation/display section so as to input an order of recording the voice in response, the control section changes over the change-over unit to the side of the voice-coding/synthesizing device so that the network controlling device is connected with the voice-coding/synthesizing device. Further, the control section gives a command to the network controlling device so as to connect the handset with the facsimile device side, and thereby the handset is connected with the voice-coding/synthesizing device through the change-over unit 13. Futher, the control section displays on the manipulation/display section a series of manipulation guidance messages, for instance, an order to push the start key for inputting the responding voice and push the stop key after finishing the voice inputting operation, and the same waits for pushing the start key.

When the start key is pushed, the voice-coding/synthesizing device starts the voice-coding operation, performs coding of the voice message that is input from the handset, and stores the coded voice message in a voice data memory as a response voice message data. And then, when the stop key is pushed, the operation of voice coding in the voice-coding/synthesizing device stops and the change-over unit selects the MODEM. And further, the network controlling device changes over the handset to the circuit side, so that the device returns back to the initial state (waiting state).

In such a manner as mentioned heretofore, when the voice responding message of an operator is stored in a voice data memory, the control section thereafter causes the change-over unit to select the voice-coding/synthesizing device whenever the detection of calling arrival is noticed from the network control device. And then, the voice message data stored in the voice data memory is synthesized by the voice-coding/synthesing device.

Thereby a response voice signal corresponding to the response voice message data is created by the voice-coding/synthesizing device. The response voice signal is sent out onto the telephone circuit through (by way of) the change-over unit and the network control device.

Further, when the outputting of the response voice signal is terminated, the control section changes over the change-over unit to the side of the MODEM. Under such condition, the operation of the device is transferred to the operation in accordance with the procedure of the normal facsimile transmission control.

In such a way, a person (a wrong operator) who made a call (dialing) by handling the facsimile device wrongly can hear from the receiver a message called by another person, that is, an operator of the facsimile device, for instance, response voice saying "This telephone circuit is connected with a facsimile device.", or the like message. Therefore, a wrong operator can immediately notice his or her mistaken operation and thereby can operate the device correctly by making a confirmation of the telephone (or facsimile) number, etc.

However, in such a conventional device, a special mechanism is needed to be provided in order to respond to the voice message. It follows that the above-mentioned matter may be an obstacle against providing a small-sized data transmitting device. And further, sometimes the voice message is recorded and reproduced by the audio tape recorder. On that occasion, it is necessary to perform a manipulation (control) for rewinding the sound-recording tape or to exchange the sound-recording tape for other one, so that it is time consuming to employ the device. Those matters are considered to be inconveniences or defects of the prior-art device.

SUMMARY OF THE INVENTION

It is an object of the present invention to improve the above-mentioned digital signal processing device for processing signals in audio-frequency bandwidth for use in facsimile device.

It is another object of the present invention to eliminate various inconveniences of the prior art.

It is still another object of the present invention to provide a device for processing digital signal in audio-frequency bandwidth capable of realizing a voice processing function such as responding to voice or the like by use of a small-sized device.

Other objects and features of the present invention will be apparent from the following detailed description and claims in accordance with the accompanying drawings.

DESCRIPTION OF THE PREFERRED EMBODIMENTS

The conventional facsimile device capable of outputting the response voice message onto the telephone circuit when the arrival of call (dialing) is detected has been practically used, by way of example. An embodiment of such a facsimile device is shown in FIG. 1.

Figure 1:
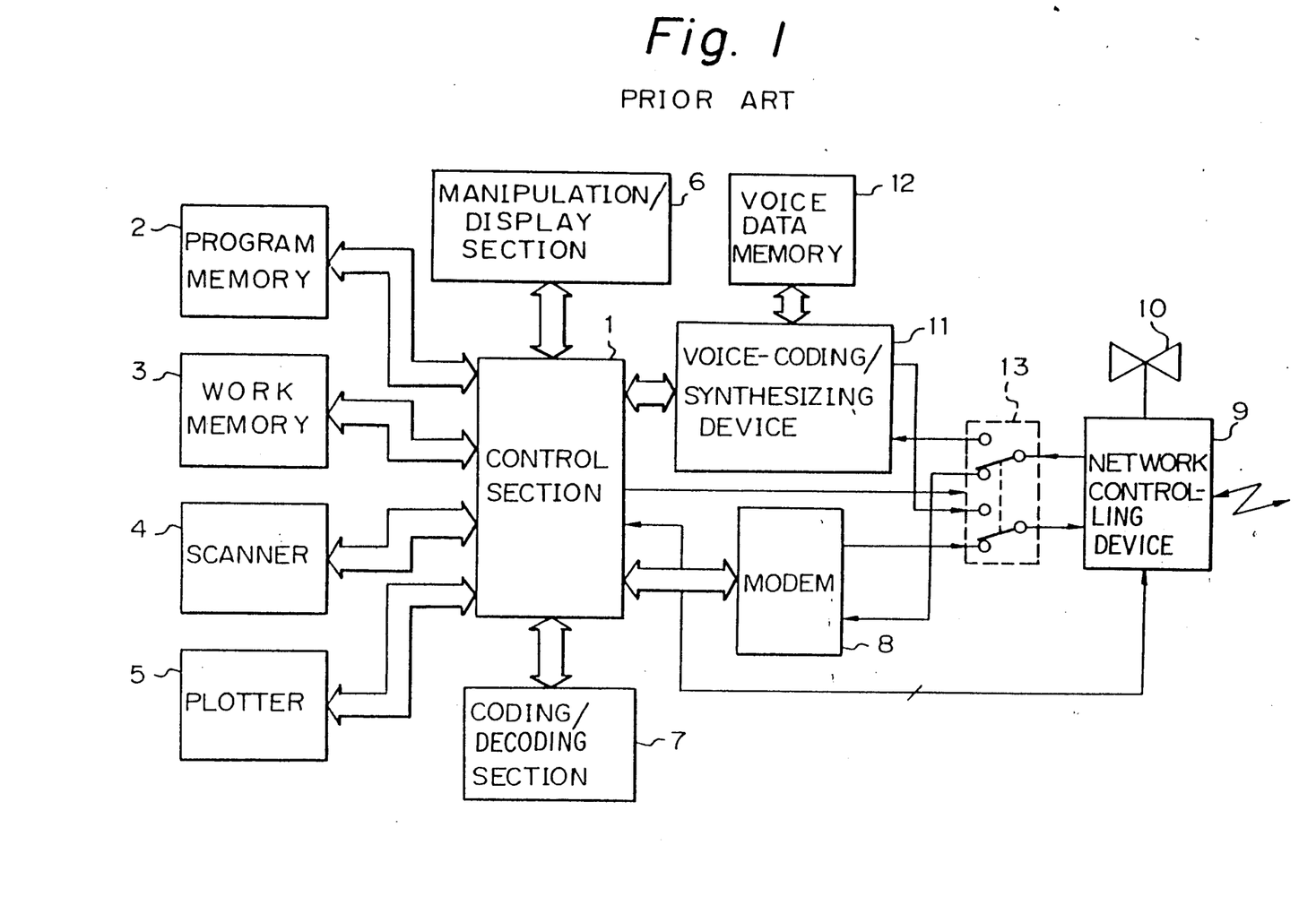
FIG. 1 is a block diagram showing a prior-art facsimile device provided with the voice-responding function.

In FIG. 1, a control section 1 is the portion used for performing a control processing for the overall facsimile device, control procedure processing for facsimile transmission, and further this control program thereof is stored in a program memory 2, and a work area is formed in a work memory 3. A scanner 4 is used as a unit for reading out an original manuscript to be transmitted with a predetermined image resolution. A plotter 5 is a unit for outputting (printing out) a received image with a predetermined image resolution. A manipulation/display section 6 is a unit for manipulating the facsimile device. A coding/restoring (decoding) section 7 is a unit for coding in compress form the image signal to be transmitted and, in addition, for restoring a received image information to an original image signal.

A MODEM section 8 has a function of modulating and demodulating the digital data such that the analog circuit network such as public telephone circuit network, etc. can be employed as a transmission circuit. A network controlling device 9 is employed for connecting the facsimile device with the public telephone circuit network. A handset 10 is employed for speaking over the telephone by use of the telephone circuit and recording the voice in response. Moreover, the network controlling device 9 is provided with an automatic transmitting and receiving function.

A voice-coding/synthesizing device 11 has the ability of converting the voice message to a coded signal in order to create the voice data corresponding thereto and the same further has a function of synthesizing the original voice data. The voice data memory 12 stores the voice data created by the voice-coding/synthesizing device 11. And further, as a coding system of the voice-coding/synthesizing device 11, it will be possible to employ, for instance, an Application Difference Part PCM (ADPCMf) System, etc. recommended by CCITT.

A change-over unit (switch) 13 connects the facsimile device side connection terminal of the network controlling device 9 with the MODEM 8 or the voice-coding/synthesizing device 11 by the action of change-over.

In the construction as mentioned heretofore, when an operator manipulates the manipulation/display section 6 so as to input an order of recording the voice in response, the control section 1 changes over the change-over unit 13 to the side of the voice-coding/synthesizing device 11 such that the network controlling device 9 is connected with the voice-coding/synthesizing device 11. And further, the control section 1 gives a command to the network controlling device 9 so as to connect the handset 10 with the facsimile device side, and thereby the handset 10 is connected with the voice-coding/synthesizing device 11 through the change-over unit 13. And further, the control section 1 displays on the manipulation/display section 6 a series of manipulation guidance messages, for instance, an order to push the start key for inputting the responding voice and push the stop key after finishing the voice inputting operation, and the same waits for pushing the start key.

When the start key is pushed, the voice-coding/synthesizing device 11 starts the voice-coding operation, performs coding of the voice message that is input from the handset 10, and stores the coded voice message in a voice data memory 12 as a response voice message data. And then, when the stop key is pushed, the operation of voice coding in the voice-coding/synthesizing device 11 stops and the change-over unit 13 selects the MODEM 8. And further, the network controlling device 9 changes over the handset 10 to the circuit side, so that the device returns back to the initial state (waiting state).

In such a manner as mentioned heretofore, when the voice responding message of an operator is stored in a voice data memory 12, the control section 1 thereafter causes the change-over unit 13 to select the voice-coding/synthesizing device 11 whenever the detection of calling arrival is noticed from the network control device 9. And then, the voice message data stored in the voice data memory 12 is synthesized by the voice-coding/synthesing device 11.

Thereby a response voice signal corresponding to the response voice message data is created by the voice-coding/synthesizing device 11. The response voice signal is sent out onto the telephone circuit through (by way of) the change-over unit 13 and the network control device 9.

And further, when the outputting of the response voice signal is terminated, the control section 1 changes over the changes over the change-over unit 13 to the side of the MODEM 8. Under such condition, the operation of the device is transferred to the operation in accordance with the procedure of the normal facsimile transmission control.

In such a way, a person (a wrong operator) who made a call by handling the facsimile device wrongly can hear from the receiver a message called by another person, that is, an operator of the facsimile device. Therefore, the wrong operator can immediately notice the mistaken operation, and thereby the same can operate the device correctly by making a confirmation of the telephone (or facsimile) number, etc. However, in such a conventional device, a special mechanism needs to be provided in order to respond to the voice message. It follows that the above-mentioned matter may be an obstacle against providing a small-sized data transmitting device. And further, sometimes the voice message is recorded and reproduced by the audio tape recorder. On that occasion, it is necessary to perform a manipulation (control) for rewinding the sound-recording tape or to exchange the sound-recording tape for the other one, so that it is time consuming to employ the device. Those matters are considered to be inconveniences or defects in the prior-art devices.

In order to improve the conventional prior art device, and attain the afore-mentioned objects of the present invention, a voice-coding/synthesizing function is added to the function of the digital signal processing means for realizing a digital MODEM function necessary for data transmission, and those functions can be selectively performed. Referring to the attached drawings, an embodiment of the present invention is explained in detail hereinafter.

Figure 2:
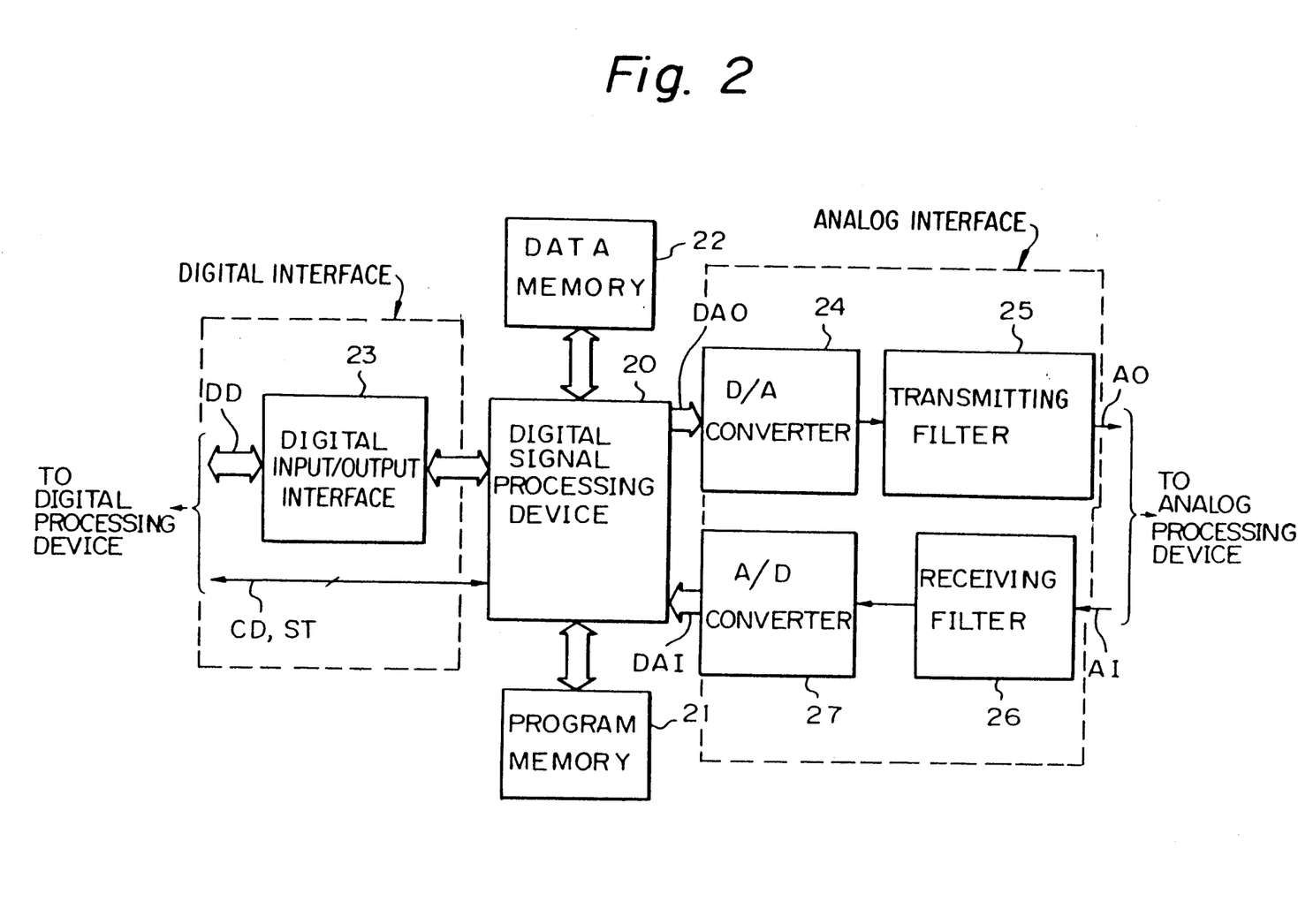
FIG. 2 is a block diagram showing an embodiment of the device for processing digital signal according to the present invention.

FIG. 2 is a block diagram showing an embodiment of a device for processing digital signal in audio-frequency bandwidth according to the present invention. This digital signal processing device realizes, for instance, a MODEM function of the facsimile device and a voice-coding/synthesizing function for responding to the voice. In FIG. 2, a digital signal processing device 20 executes the processing of the function/control of the device for processing digital signal in audio-frequency bandwidth. The processing program thereof is stored in a program memory 21 and its work area is formed in a data memory 22. Further, a command signal CD which represents various commands in relation to the operation of the device, for example, function changeover or the like is applied to the digital signal processing device 20 from the digital processing device (not shown in FIG. 2) such as the control section of the facsimile device or the like. A state signal ST is sent from the device 20 representing the internal state to the digital processing device in response to the command signal.

A digital interface circuit 23 is a block for transmitting and receiving digital data DD between the digital processing device and the digital signal processing device 20.

A digital-to-analog converter 24 is a block for converting output data DAO which is formed by the digital signal processing device 20 and transmitted to the analog processing device (for instance, network controlling device of the facsimile device, etc.) to an analog signal corresponding thereto in a predetermined period of time. The analog signal is wave-reformed (rectified) through a transmission filter 25, and thereafter the same is output (sent out) to the analog processing device as an analog output signal AO. A receiving filter 26 is a block for wave-reforming an analog input signal AI which is input from the analog processing device. The output signal of the receiving filter 26 is sampled through an analog-to-digital converter 27 at a predetermined time interval and converted to a digital signal DAI corresponding thereto, and thereafter applied to the digital signal processing device 20.

Figure 3:
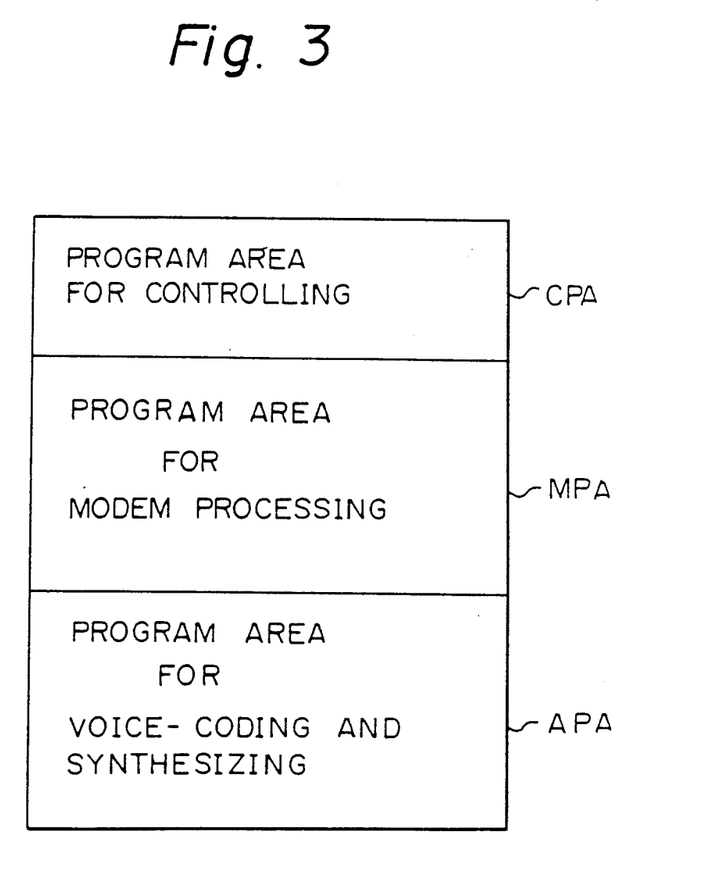
FIG. 3 is an outlined view exemplarily showing the contents stored in the program memory.

The storing area of the program memory 21, as shown in FIG. 3, consists of a program area CPA for controlling, in which a control program for controlling the operation of the digital signal processing device 20 is stored; a program area MPA for processing MODEM in which a MODEM processing program putting the device in a functioning state function so as to process digital signal in the audiofrequency bandwidth as a digital MODEM is stored; and a program area APA for use in the voice-coding/synthesizing processing employed for storing a voice-coding/synthesizing program putting the device in a functioning state for processing digital signal in audio-frequency bandwidth as the voice-coding/synthesizing device. The digital signal processing device 20 always executes the program for controlling the program area CPA. When the order signal CD orders to execute MODEM function, the MODEM processing program in the MODEM processing program area MPA is executed. When execution is stopped by way of the order signal CD, the execution of the MODEM processing program is interrupted, and then the internal state returns (or is restored) and the program for controlling is executed.

Furthermore, when the execution of the voice-coding function is ordered by the order signal CD the program of the voice-coding processing in the program area APA for use in the voice-coding/synthesizing processing is executed, and when the execution of the voice synthesizing function is ordered by the order signal CD the program of the voice synthesizing processing in the same area APA is executed. Under such the conditions of execution, when the stopping of execution is ordered by the order signal CD the execution of the voice-coding/synthesizing processing program is interrupted, the internal state returns (or restores) and the program of controlling is executed.

Figure 4:
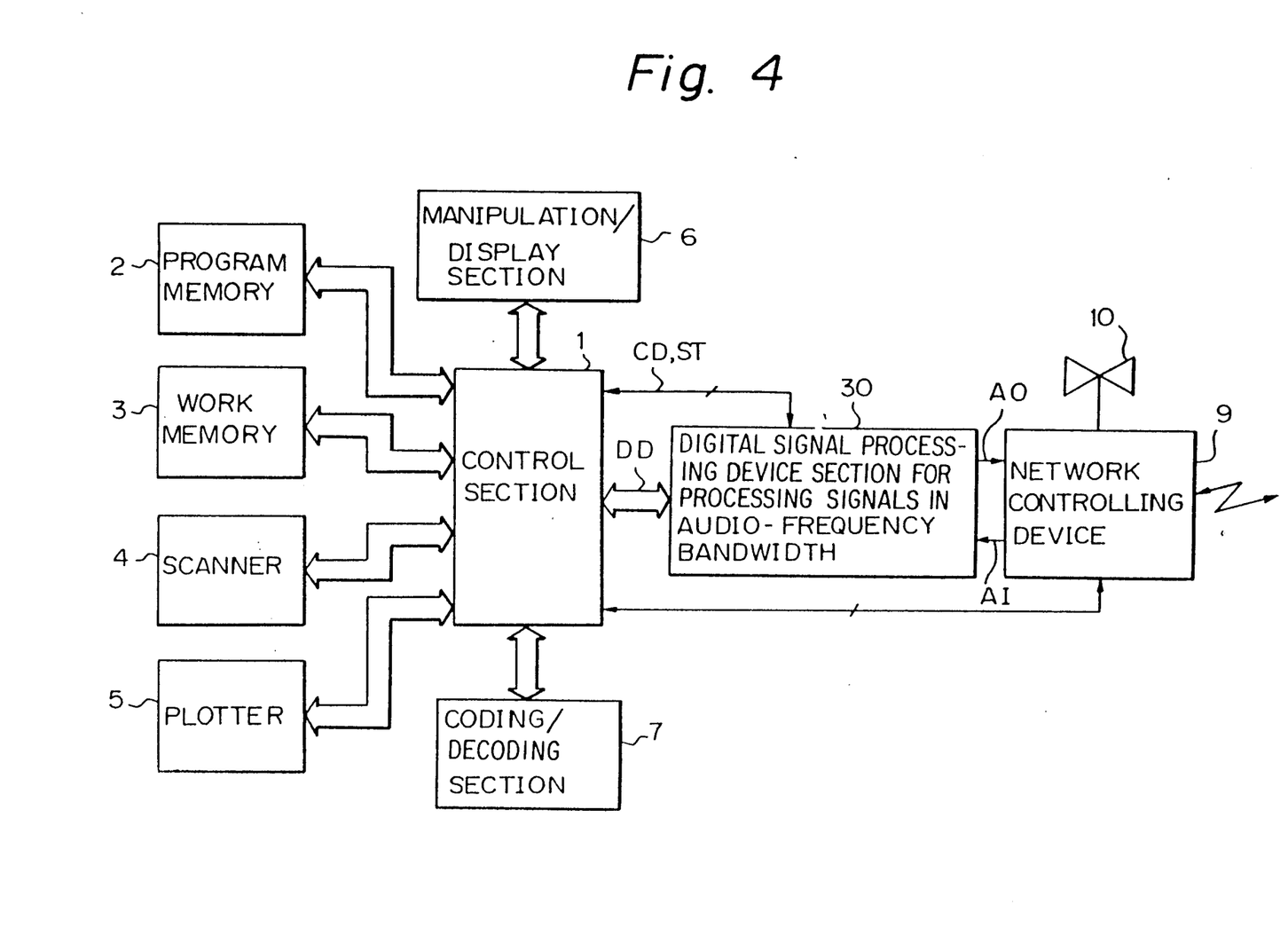
FIG. 4 is a block diagram exemplarily showing the device for processing digital signal in audio-frequency bandwidth to be applied to the facsimile device according to the present invention.

FIG. 4 is a block diagram showing an embodiment of the facsimile device according to the present invention which utilizes the device for processing digital signal in audio-frequency bandwidth as shown in FIG. 2. Furthermore, in FIG. 4, same symbol is attached to the same parts as or corresponding to those shown in FIG. 1, and the explanation thereof is omitted. And further, the explanation of any part not especially relating to the present invention (and for instance, the explanation of its operation) is also omitted.

In FIG. 4, a device for processing digital signals in the audio-frequency bandwidth 30 is disposed between the control section 1 and the network control device 9, and the device 30 transmits the digital data DD to the control section 1 and receives the digital data DD therefrom, and the same outputs (transmits) an analog output signal AO to the network control device 9 and inputs (receives) an analog input signal AI therefrom. Furthermore, an order signal CD is applied to the device 30 from the control section 1.

In the construction as mentioned heretofore, when an operator manipulates (inputs) the manipulation/display section 6 so as to record the response voice, the control section 1 orders the network control device 9 to connect the handset 10 to the facsimile device side. Thereby, the handset 10 is connected through the network control device 9 with the afore-mentioned device for processing digital signal in audio-frequency bandwidth 30.

Next, the control section 1 orders to display on the manipulation/display section 6 a series of manipulation guidance messages such as pushing the start key for inputting (receiving) the response voice and pushing the stop key when the inputting of the response voise is terminated, and the same section 1 waits for the pushing of the start key.

When the start key is pushed, the control section 1 orders the execution of the function of voice-coding, to the device 30, by way of the order signal CD.

Under such condition, the device 30 executes the program for processing the voice-coding of the program memory 21 thereafter. In consequence, voice data are formed corresponding to the analog input signal AI input (received) from the network control device 9, and the received data are output (transmitted) to the control section 1 as digital data DD.

The control section 1 stores in order the digital data DD input (received) from the device for processing digital signal in audio-frequency bandwidth 30 as response voice message data in the storing area employed for the response voice message data of the work memory 3.

And further, when the stop key is pushed, stopping of the execution is ordered by the order signal CD and the processing of voice-coding in the device 30 is interrupted and the taking-in of the digital data DD is stopped. And, thereby, the device for processing digital signal in audio-frequency bandwidth 30 interrupts the execution of the program for processing the voice-coding, and the state thereof proceeds to the executing state of the control program. In such a way, when the voice responce message of the operator is stored in the work memory 3, the control section 1 thereafter orders to execute the function of voice synthesizing to the device for processing digital signal in audio-frequency bandwidth 30 by use of the order signal CD, when the detection of receiving a telephone call is noticed by the network controlling device 9.

Thereby, the state of the device 30 is changed over to the executing state of the voice-coding processing program of the program memory 2. When the completion of its preparing is noticed, the control section 1 takes out the response voice message data stored in the work memory 3 at a predetermined period of time and transfers the taken-out data as the digital data DD to the device for processing digital signal in audio-frequency bandwidth 30.

Thereby, the device 30 converts the digital data DD to the analog output signal AO of the voice message corresponding thereto, and the converted analog output signal AO is output (transmitted) to the network control device 9. Thereby, the response voice message input (received) by the operator of the facsimile device is sent out to the telephone circuit.

And further, when the transmission of the response voice message data is terminated, the control section 1 orders the device for processing digital signal in the audio-frequency bandwidth 30 to stop the execution of voice synthesizing by use of the order signal CD, and this interrupts the voice synthesizing processing and stops the sending-out of the response voice message. And, thereby, the device 30 interrupts the execution of the voice synthesis processing program and proceeds to the executing state of the control program.

In such a way, when the sending-out of the response voice message is terminated, the control section 1 orders the device for processing digital signal in audio-frequency bandwidth 30 to execute the function of the MODEM. Thereafter, the function of the device 30 is changed over to that of the digital MODEM, and the operation of the control section 1 is transferred to that of the normal facsimile transmission control procedure. Furthermore, when a series of facsimile transmission control procedures are terminated, the order signal CD orders the device 30 to stop the execution, interrupts the digital MODEM processing, and thereby stops the digital MODEM function. And, thereby, the device for processing digital signal in the audio-frequency bandwidth 30 interrupts the execution of the MODEM processing program and the state thereof proceeds to the execution state of the control program.

Consequently, since a person who made a wrong call by use of the facsimile device receives from the receiver a message of the operator employing the facsimile device, for instance, "This telephone circuit is connected to a facsimile device." or the like, it follows that the person immediately notices his or her mistake and makes a confirmation of the telephone number, etc. and performs a correct manipulation of the device.

As is explained heretofore, the device for processing digital signal in audio-frequency bandwidth 30 according to the present invention adds the voice-coding/synthesizing function to the digital signal processing device for realizing a digital MODEM function necessary for the data communication device employing the analog circuit, and the same selectively use those functions. Therefore, the voice processing function such as responding to the voice, or voice accumulation/response, etc. can be realized by use of very small-sized device, so that the device of the present invention is profitable from the view point of space. Moreover, in the above-mentioned embodiment, the digital signal processing portion of the device for processing digital signal in audio-frequency bandwidth 30 always executes the control program. And further, the same executes either one of the digital MODEM function and the voice-coding/synthesizing function in accordance with the order signal given by the digital processing device. However, the method of changing-over the function is not limited to the above-mentioned.

And further, the device for processing digital signal in audio-frequency bandwidth can be likewise applied to the data communication device, in addition to the facsimile device. Furthermore, in the above-mentioned embodiment, ADPCMf system is employed as the voice-coding system. However, other voice coding systems can be applied to the present invention.

As is apparent from the foregoing description, according to the present invention, since the voice-coding/synthesizing function is added to the digital signal processing means for realizing the digital MODEM function necessary for transmitting the data and those functions can be selectively performed, it may be possible to obtain an effect that the voice processing function such as responding to the voice can be realized by use of a small-sized device.

What is claimed is:

1. A digital signal processing device for processing signals in audio-frequency bandwidth for use in a facsimile device, said digital signal processing device comprising:
  (a) digital input-output interface means for transmitting first digital data to an external digital processing device and receiving second digital data therefrom,
  (b) digital signal processing means for converting a digital signal input from said digital processing device through said digital input-output interface means to an analog signal in audio-frequency bandwidth corresponding thereto in accordance with a constant operational rule and outputting said converted analog signal through an analog input-output interface means to an analog processing device, and further for converting said analog signal in audio-frequency bandwidth input from said analog processing device through said analog input-output interface means to a digital signal corresponding thereto in accordance with another constant operational rule and outputting said converted digital signal through said digital input-output interface means to said digital processing device, which is for controlling the execution of function/control processing of said digital signal processing device, by said digital signal processing means which selectively employs either one of a MODEM function processing program and a voice-coding/synthesizing function program in accordance with an external command,
  (c) wherein said analog input-output interface means is for transmitting and receiving digital data between said digital signal processing means and said analog input-output interface means, transmitting first analog data to an analog processing device and receiving second analog data therefrom,
  (d) data memory means for forming a work area therein, said work area being employed for temporarily storing a voice message, and
  (e) program memory means for storing said MODEM function processing program for said digital signal processing means to realize a digital MODEM function and said voice-coding/synthesizing function program for said digital signal processing means to realize said voice-coding/synthesizing function, wherein said digital signal processing device transmits a predetermined voice message to a communication partner and thereafter the operation thereof transfers to control of a facsimile transmitting-/receiving function and starts to receive image information from said communication partner.

2. A digital signal processing device for processing signals in audio-frequency bandwidth for use in a facsimile device as defined in claim 1, said digital processing means being capable of executing predetermined digital signals processing such as function/control processing in accordance with the programs stored in said program memory means.

3. A digital signal processing device for processing signals in audio-frequency bandwidth for use in a facsimile device as defined in claim 1, said digital input-output interface means transmitting and receiving digital data between said digital signal processing means and an external digital processing device.

4. A digital signal processing device for processing signals in audio-frequency bandwidth for use in a facsimile device as defined in claim 1, said analog input-output interface means comprising:
  a digital-to-analog converter for conversion of signals from digital to analog form,
  a transmitting filter coupled to said digital-to-analog converter, and
  a receiving filter coupled to an input of said analog input-output interface means and an analog-to-digital converter.

5. A digital signal processing device for processing signals in audio-frequency bandwidth for use in a facsimile device as defined in claim 4, said digital-to-analog converter converting digital output data created by said digital signal processing means to said first analog data corresponding thereto at a predetermined period of time in order to send said converted first analog data to said transmitting filter.

6. A digital signal processing device for processing signals in audio-frequency bandwidth for use in a facsimile device as defined in claim 4, said transmitting filter transmitting said first analog data to said analog processing device as an analog output signal after rectifying the wave form of said analog output signal through said transmitting filter.

7. A digital signal processing device for processing signals in audio-frequency bandwidth for use in a facsimile device as defined in claim 4, said receiving filter receiving said second analog data as an analog input signal and rectifying the wave form of said analog input signal through said receiving filter.

8. A digital signal processing device for processing signals in audio-frequency bandwidth for use in a facsimile device as defined in claim 4, said analog input signal of said receiving filter being sampled through said analog-to-digital converter at a predetermined interval of time and converted to a digital signal corresponding thereto that is to be applied to said digital signal processing means.

9. A digital signal processing device for processing signals in audio-frequency bandwidth for use in a facsimile device as defined in claim 1, a processing program for executing a function/control processing program of said digital signal processing means being stored in said program memory means.

10. A digital signal processing device for processing signals in audio-frequency bandwidth for use in a facsimile device as defined in claim 9, further comprising:
a storing area in said program memory means which has a control program area, a MODEM processing program area and a voice-coding/synthesizing processing program area.

11. A digital signal processing device for processing signals in audio-frequency bandwidth, said device comprising:
(a) digital input-output interface menas for transmitting first digital data to an external digital processing device and receiving second digital data therefrom,
(b) digital signal processing means for executing function/control processing of said digital signal processing device, said digital signal processing means employing either one of a MODEM function processing program and a voice-coding/synthesizing function program in accordance with an external command,
(c) analog input-output interface means for transmitting and receiving digital data between said digital signal processing means and said analog input-output interface means, transmitting first analog data to an analog processing device and receiving second analog data therefrom,
(d) data memory means for forming a work area therein, said work area being employed for temporarily storing a voice message, and
(e) program memory means for storing said MODEM function processing program for said digital signal processing means to realize a digital MODEM function and said voice-coding/synthesizing function program for said digital signal processing means to realize said voice-coding/synthesizing function,
wherein said digital signal processing device transmits a predetermined voice message to a communication partner and thereafter the operation thereof transfers to control of facsimile transmitting-/receiving function and starts to receive image information from said communication partner.

12. A facsimile device for processing signals in audio-frequency bandwidth comprising:
a program memory for storing a control program,
a work memory for forming a work area,
a scanner for reading out an original manuscript to be transmitted with a predetermined resolution,
a plotter for recording and outputting a received image signal with a predetermined resolution,
a manipulation/display section for manipulating said facsimile device and displaying the state of manipulation,
a control section for performing a control-processing of the facsimile device and a processing of a facsimile transmission control procedure,
a coding/decoding section for compressingly coding a transmitted image signal and decoding information of said received image signal in the form of an original image signal,
a network controlling device for connecting said facsimile device with a public telephone circuit network,
a handset for speaking by use of the telephone circuit network and recording a voice in response thereto, and
a digital signal processing device section for processing signals in audio-frequency bandwidth for transmitting and receiving digital data between said device section and said control section, for transmitting first analog data to said network controlling device, and for receiving second analog data therefrom.

13. A facsimile device for processing signals in audio-frequency bandwidth as defined in claim 12,
said digital signal processing device section comprising:
digital input-output interface means for transmitting first digital data to an external digital processing device and receiving second digital data therefrom,
digital signal processing means for executing function/control processing of said digital signal processing device, said digital signal processing means selectively employing either one of a MODEM function processing program and a voice-coding/synthesizing function program in accordance with an external command,
analog input-output interface means for transmitting and receiving digital data between said digital signal processing means and said analog input-output interface means, transmitting first analog data to said network controlling device and receiving second analog data therefrom,
data memory means for forming a work area therein, said work area being employed for temporarily storing a voice message, and
program memory means for storing said MODEM function processing program for said digital signal processing means to realize a digital MODEM function and said voice-coding/synthesizing function program for said digital signal processing means to realize said voice-coding/synthesizing function,
wherein said digital signal processing device transmits a predetermined voice message to a communication partner and thereafter the operation thereof transfers to control of facsimile transmitting-/receiving function and starts to receive image information from said communication partner.

14. A facsimile device for processing signals in audio-frequency bandwidth as defined in claim 12, said digital signal processing device section being disposed between said control section and said network controlling device.

* * * * *